(12) United States Patent
Veit et al.

(10) Patent No.: US 7,718,748 B2
(45) Date of Patent: May 18, 2010

(54) ANTIMICROBIAL POLYMERIZABLE EAR PIECE MATERIAL

(75) Inventors: Thomas Veit, Munster (DE); Martin Klare, Dortmund (DE); Michael Kutschinski, Castrop-Rauxel (DE); Reiner Altmann, Castrop-Rauxel (DE)

(73) Assignee: Dreve-Otoplastik GmbH, Unna (DE)

( * ) Notice: Subject to any disclaimer, the term of this patent is extended or adjusted under 35 U.S.C. 154(b) by 422 days.

(21) Appl. No.: 11/581,790

(22) Filed: Oct. 16, 2006

(65) Prior Publication Data

US 2007/0088098 A1    Apr. 19, 2007

(30) Foreign Application Priority Data

Oct. 19, 2005    (EP)    ................... 05022757

(51) Int. Cl.
*C08G 77/06* (2006.01)

(52) U.S. Cl. .............. 528/15; 528/10; 528/14; 528/31; 528/32; 528/33; 524/413; 524/434; 524/435; 524/439; 524/440; 524/847; 524/860; 524/861; 524/862; 524/588

(58) Field of Classification Search ............. 528/14–15, 528/31–33, 10; 428/446–447; 524/413, 524/434–435, 439, 440, 847, 860–862
See application file for complete search history.

(56) References Cited

U.S. PATENT DOCUMENTS

| | | | |
|---|---|---|---|
| 6,191,247 B1 * | 2/2001 | Ishikawa et al. | 528/30 |
| 6,475,631 B1 | 11/2002 | Yamamoto et al. | 428/480 |
| 6,559,199 B1 * | 5/2003 | Pusineri et al. | 523/109 |
| 2005/0048124 A1 * | 3/2005 | Sarangapani | 424/486 |
| 2007/0122356 A1 | 5/2007 | Kessler et al. | 424/49 |

* cited by examiner

*Primary Examiner*—Randy Gulakowski
*Assistant Examiner*—Olatunde S Ojurongbe
(74) *Attorney, Agent, or Firm*—Jonathan Myers; Andrew Wilford

(57) ABSTRACT

A two-component addition-crosslinking silicone comprises
(a) 0.1-70% by weight polyorganosiloxanes containing at least two unsaturated groups in the molecule;
(b) 0.1-15% by weight polyorganohydrogensiloxanes containing at least two SiH groups in the molecule;
(c) 0.01-2.0% by weight noble metal catalyst; and
(d) 0.1-5% by weight of a non-toxic antimicrobial additive or a combination of at least two non-toxic antimicrobial additives.

3 Claims, No Drawings

ANTIMICROBIAL POLYMERIZABLE EAR PIECE MATERIAL

FIELD OF THE INVENTION

The present invention relates to an antimicrobial polymerizable material used as an ear piece. More particularly this invention concerns polyorganosiloxanes, which are provided with an antimicrobial effect, used in hearing aids acoustics. Since these ear pieces are generally painted, the invention further relates to the preparation of antimicrobial paints for surface treatment of ear pieces.

BACKGROUND OF THE INVENTION

Both indirect and direct methods are currently used for producing ear pieces for noise and swim protection, Since the demands on user comfort are very high, the dimensional accuracy and precision fit of the silicone ear piece are extremely important, Addition-crosslinking silicones have proven to be particularly suitable, which in contrast to condensation-crosslinking silicones, undergo only slight shrinkage and therefore have particularly high dimensional stability, However, condensation-crosslinking silicones may also be used.

Condensation-crosslinking silicones according to the prior art comprise (some or all of) the following components as the base mass:

(1) Polyorganosiloxanes containing two end-position hydroxyl groups in the molecule;
(2) Polyorganosiloxanes containing no reactive groups;
(3) Reinforcing fillers having a charged or uncharged surface;
(4) Non-reinforcing fillers;
(5) Oils and/or other softeners;
(6) Other additives and customary addition agents, adjuvants, and dyes;
(7) Catalytically active additives;
(8) Inhibitors;

The compounds listed under (1) are polyorganosiloxanes containing end-position reactive hydroxyl groups having a viscosity of approximately 200 mPa·s to 400,000 mPa·s, preferably 1000 mPa·s to 350,000 mPa·s, at 23° C.

The compounds listed under (2) include silicone oils, which like the compounds under (1) are polyorganosiloxanes, but which contain groups that are unreactive for the condensation crosslinking reaction. Such compounds are described, for example, in W, Noll, "Chemie und Technologie der Silikone" [Chemistry and Technology of Silicones], Verlag Chemie Weinheim, 1968.

Reinforcing fillers under (3) generally have a BET surface of greater than 50 $m^2/g$ and include, for example, pyrogenic or precipitated silicic acids and silicon-aluminum mixed oxides. In view of their hydrophilic surface, these fillers are particularly suited for use with hydroxyl polyorganosiloxanes, but may also be made hydrophobic by surface treatment with, for example, hexamethyldisilazane or organosiloxanes or organosilanes.

The non-reinforcing fillers under (4) have a BET surface of less than or equal to 50 $m^2/g$ and include quartzes, cristobalites, diatomaceous earths, kieselguhrs, calcium carbonates, talc, zeolites, sodium aluminum silicates, metal oxide powders, and glass powders. These fillers, as in the case for the reinforcing fillers, may also be made hydrophobic by surface treatment.

Examples of compounds under (5) are hydrocarbons, particularly preferably paraffin oils.

Paint pigments and other adjuvants may also be contained as additives. For controlling the reactivity it may be necessary to use catalytically active additives (7), generally water or organic acids such as benzoic acid, or inhibitors (8) such as very short-chain, end-blocked hydroxyl siloxanes.

The condensation reaction is initiated by mixing the base mass with a curing paste as a second component, The proportion of curing paste in the mixture varies from 1 to 10 percent by weight, preferably 2 to 5 percent by weight, relative to the base mass.

A curing paste according to the prior art comprises the following components:

(1) catalyst for the condensation crosslinking, generally an organotin compound such as dibutyl tin dilaurate or dibutyl tin oxide;
(2) hydrolyzable reactants, generally silicic acid esters such as vinyl triethoxysilane or tetraethyl silicate;
(3) a carrier material, generally mineral oil products such as Vaseline; and
(4) other additives and customary addition agents, adjuvants, and dyes.

The base mass may also be mixed with a curing liquid. The curing liquid is composed of only components (1) and (2) and optionally (4), i.e., is prepared without a carrier material and therefore has a low viscosity.

Addition-crosslinking silicones according to the prior art comprise (some or all of) the following components:

(1) polyorganosiloxanes containing at least two unsaturated groups in the molecule;
(2) polyorganohydrogensiloxanes containing at least two SiH groups in the molecule;
(3) polyorganosiloxanes containing no reactive groups;
(4) noble metal catalyst;
(5) reinforcing fillers having a charged or uncharged surface;
(6) non-reinforcing fillers;
(7) Oils or other softeners;
(8) Other additives and customary addition agents, adjuvants, and dyes; and
(9) inhibitors.

The compounds listed under (1) are polyorganosiloxanes containing end-position and/or side-position reactive groups having a viscosity of approximately 50 mPa·s to 165,000 mPa·s, preferably 200 mPa·s to 65,000 mPa·s, at 23° C.

The compounds listed under (2) include SiH groups which form the polymer in an addition reaction with compounds (1) under noble metal catalysis.

The compounds listed under (3) include silicone oils, which like the compounds under (1) are polyorganosiloxanes, but which contain groups that are unreactive for the noble metal-catalyzed addition crosslinking reaction. Such compounds are described, for example, in W, Noll, "Chemie und Technologie der Silikone," Verlag Chemie Weinheim, 1968.

The noble metal catalyst (4) preferably is a platinum complex, Platinum-siloxane complexes as described in U.S. Pat. No. 3,715,334, U.S. Pat. No. 3,775,352, and U.S. Pat. No. 3,814,730 which are particularly well suited.

Reinforcing fillers under (5) generally have a BET surface of greater than 50 $m^2/g$ and include, for example, pyrogenic or precipitated silicic acids and silicon-aluminum mixed oxides. The referenced fillers may be made hydrophobic, for example, by surface treatment with hexamethyldisilazane or organosiloxanes or organosilanes non-reinforcing fillers under (6) have a BET surface of less than or equal to 50 $m^2/g$ and include quartzes, cristobalites, diatomaceous earths, kieselguhrs, calcium carbonates, talc, zeolites, sodium aluminum silicates, metal oxide powders, and glass powders. These fillers, similarly as for the reinforcing fillers, may also be made hydrophobic by surface treatment.

Examples of compounds under (7) are hydrocarbons, particularly preferably paraffin oils.

Paint pigments and other adjuvants may also be contained as additives, for example finely divided platinum or palladium as hydrogen absorbers. It may be necessary to add inhibitors (9) to control the reactivity. Such inhibitors are known, and, for example, are described in U.S. Pat. No. 3,933,880. These inhibitors generally are acetylenically unsaturated alcohols or vinyl group-containing poly-, oligo-, and disiloxanes.

The masses are preferably formulated in two components to ensure stability under storage, The entire content of noble metal catalyst (4) should be provided in the catalyst component, and the entire content of SiH compound (2) should be provided in the second component, spatially separated from the first component, of the base mass. Mixing the two components causes the masses to cure in an addition reaction known as hydrosilylation.

The volume ratios of the two components may be from 10:1 to 1:10, Particularly preferred are volume mixing ratios of 1:1, 4:1, and 5:1 (base to catalyst component), For the paint, volume mixing ratios of 40:1 to 1:40 (base to catalyst component) are preferred.

According to the prior art, silicone ear pieces are sometimes provided with a painted surface finish, using a paint. Such a paint has the following composition:

(1) Polyorganosiloxanes containing at least two unsaturated groups in the molecule;
(2) Polyorganohydrogensiloxanes containing at least two SiH groups in the molecule;
(3) Polyorganosiloxanes containing no reactive groups;
(4) Noble metal catalyst;
(5) Reinforcing fillers having a charged or uncharged surface;
(6) Inhibitors;
(7) Organic solvent;

The previous description also applies for the ingredients (1) through (6), This paint is also a two-component material, and the above comments apply here as well. The organic solvents used according to the invention have a boiling point in the range of 40° to 200° C., preferably 70° to 150° C., particularly preferably 100° to 140° C., at 1013 hPa, Cyclic and aliphatic hydrocarbons such as cyclohexane, n-hexane, n-heptane, toluene, and benzene may be considered. The silicone ear pieces are dipped in the paint, and the paint is cured in an oven at temperatures of 140° to 200° C., Following this treatment the ear piece has a smooth, glossy surface.

Silicone ear pieces for noise or swim protection are generally worn in the ear for long periods, For this reason hygiene is particularly important. The use of silicones in the field of noise and swim protection ear pieces is known, since silicones offer a broad spectrum of mechanical and physical properties, as well as the further advantage of having little or no toxic, sensitivity, or allergenic potential. This makes them very well suited for medical applications. The precision fit of ear pieces plays a special role. The ear piece is in direct contact with the skin of the ear. The moist, warm environment in the auditory canal provides the ideal conditions for growth of microorganisms (bacteria, virus, molds, algae), and it is known that these may settle on silicones. This impairs not only the hygiene but also the esthetics of ear pieces, which are worn in the ear for long periods by persons for the purpose of noise protection, for example for occupational use, or as swim protection during swimming. Inflammations in particular may occur when the skin of the auditory canal is irritated as the result of pressure points (due to improper fit of the ear piece), or friction during chewing motions.

Imparting antimicrobial activity to the silicone materials without adversely affecting the polymerization reaction described in detail above is therefore desirable.

The protection of objects and surfaces from microorganisms has been known for many years, For example, the antimicrobial effect of silver or copper surfaces has been known for centuries although the exact mechanism was not understood. In the field of hearing aid acoustics, the firm Audio Service markets a commercial solution for coating ear pieces, based on the bactericidal and fungicidal activity of silver, under the trade mark ComforMed™.

The introduction of antimicrobial additives is also known from the field of dental impression materials. The incorporation of quaternary ammonium salts, dissolved in water, into alginates is described in EP 0 361 301. WO 00/07546 describes a silicone material used for dental impression materials which acquires antimicrobial activity by incorporation of N-chloramines and similar compounds.

The use of biguanides in addition-crosslinking silicones is known from EP-A-0 493 186.

The use of calcium hypochlorite in condensation-crosslinking silicones is documented, for example, in FR 2 707 660. In this case the effect is derived from active chlorine.

However, none of the referenced and published additives having an antimicrobial effect meet the high demands placed on polymerizable materials such as ear pieces, for example, which are worn in the ear for long periods for noise or swim protection:

The antimicrobial additive must not be toxic, and must have no sensitivity or allergenic potential.
The antimicrobial additive must be present in the polymerizable mass in sufficient quantities so that it may act on the contact surface.
The antimicrobial additive must neither inhibit the polymerization reaction nor affect the typical characteristics of the polymer.

OBJECTS OF THE INVENTION

An object of the present invention, therefore, is to provide a material for ear pieces, in particular for noise and swim protection, which is provided with antimicrobial activity without the unfavorable characteristics mentioned. This object is achieved by the use of one or more antimicrobial additives in the above-described components.

A further object of the present invention is to provide an antimicrobial paint based on silicone. This object is similarly achieved by the use of one or more antimicrobial additives in the paint.

SUMMARY OF THE INVENTION

Surprisingly, it has been found that antimicrobial activity may be imparted to polymerizable masses, in particular those based on polyorganosiloxanes, by the addition of one or more antimicrobial additives, while not affecting the important properties of the masses:

No change in stability under storage
No change in processing times and curing times
No change in hardness
No change in viscosities of the components
No change in processability Even the surface characteristics of the cured elastomers are greatly improved, thereby optimizing the precision fit, The homogeneity of the mixture of components is also improved.

The antimicrobial additives may be, on the one hand, silver nanoparticles (particle size<30 nm), such as those commercially available from Ciba and from AgPure. On the other hand, glass fillers (particle size<100 nm) which have an antimicrobial effect in the presence of moisture may also be used, such as those marketed by Schott.

These additives have the following composition:

| | |
|---|---|
| 45 ± 5% by weight | $SiO_2$ |
| 25 ± 5% by weight | $Na_2O$ |
| 25 ± 5% by weight | CaO |
| 5 ± 5% by weight | $P_2O_5$ |

The various activity mechanisms of the bacteriostatic effects of the described additives are known to those skilled in the art and may be obtained from the relevant literature. Of particular importance are the control of pH, the change in the osmotic pressure at the cell membrane, the potassium ion exchange, and irreversible reactions with thio-containing proteins.

The following exemplary embodiments provide a more detailed explanation of the invention, but in no way limit the invention.

EXAMPLE 1

Translucent Silicone Material (Comparative Example)

Catalyst Component 1.9% by weight vinyl end-blocked polydimethylosiloxane having a viscosity of 200 mPa·s;
1.9% by weight vinyl end-blocked polydimethylosiloxane having a viscosity of 1000 mPa·s;
2.8% by weight vinyl end-blocked polydimethylosiloxane having a viscosity of 10,000 mPa·s;
50.4% by weight vinyl end-blocked polydimethylosiloxane having a viscosity of 65,000 mPa·s;
8.9% by weight of a polydimethylosiloxane oil having a viscosity of 50 mPa·s;
12.0% by weight of a paraffin oil;
21.7% by weight of a pyrogenic silicic acid (surface-treated) having a BET surface between 150 $m^2/g$ and 200 $m^2/g$; and
0.4% by weight of a platinum catalyst, were set out and homogeneously mixed for 30 minutes.

The mixture was then degassed for 15 minutes under vacuum.

Base Component 1.9% by weight vinyl end-blocked polydimethylosiloxane having a viscosity of 200 mPa·s;
1.9% by weight vinyl end-blocked polydimethylosiloxane having a viscosity of 1000 mPa·s;
2.9% by weight vinyl end-blocked polydimethylosiloxane having a viscosity of 10,000 mPa·s;
49.6% by weight vinyl end-blocked polydimethylosiloxane having a viscosity of 65,000 mPa·s;
3.1% by weight of a polydimethylosiloxane oil having a viscosity of 50 mPa·s;
7.6% by weight of a paraffin oil;
21.2% by weight of a pyrogenic silicic acid (surface-treated) having a BET surface between 150 $m^2/g$ and 200 $m^2/g$; and
11.8% by weight of a polymethylhydrogensiloxane having an SiH content of 2.3 mmol/g were set out and homogeneously mixed for 30 minutes.

The mixture was then degassed for 15 minutes under vacuum.

Mixture of Catalyst and Base Components 50 parts of the catalyst component and 50 parts of the base component were discharged from a double cartridge and homogeneously mixed in a static mixer.

A cured test specimen was obtained which had a final Shore A hardness of 40 and excellent mechanical properties (tear strength, elongation at tear).

EXAMPLE 2

Opaque Silicone Material (Comparative Example)

Catalyst Component 1.9% by weight vinyl end-blocked polydimethylosiloxane having a viscosity of 200 mPa·s;
1.9% by weight vinyl end-blocked polydimethylosiloxane having a viscosity of 1000 mPa·s;
2.8% by weight vinyl end-blocked polydimethylosiloxane having a viscosity of 10,000 mPa·s;
50.1% by weight vinyl end-blocked polydimethylosiloxane having a viscosity of 65,000 mPa·s;
8.9% by weight of a polydimethylosiloxane oil having a viscosity of 50 mPa·s;
12.0% by weight of a paraffin oil;
21.7% by weight of a pyrogenic silicic acid (surface-treated) having a BET surface between 150 $m^2/g$ and 200 $m^2/g$;
0.3% by weight white pigment (titanium dioxide); and
0.4% by weight of a platinum catalyst were set out and homogeneously mixed for 30 minutes.

The mixture was then degassed for 15 minutes under vacuum.

Base Component 1.8% by weight vinyl end-blocked polydimethylosiloxane having a viscosity of 200 mPa·s;
1.8% by weight vinyl end-blocked polydimethylosiloxane having a viscosity of 1000 mPa·s;
2.8% by weight vinyl end-blocked polydimethylosiloxane having a viscosity of 10,000 mPa·s;
48.1% by weight vinyl end-blocked polydimethylosiloxane having a viscosity of 65,000 mPa·s;
3.1% by weight of a polydimethylosiloxane oil having a viscosity of 50 mPa·s;
7.6% by weight of a paraffin oil;
21.2% by weight of a pyrogenic silicic acid (surface-treated) having a BET surface between 150 $m^2/g$ and 200 $m^2/g$;
12.1% by weight of a polymethylhydrogensiloxane having an SiH content of 2.3 mmol/g;
were set out and homogeneously mixed for 30 minutes.

The mixture was then degassed for 15 minutes under vacuum.

Mixture of Catalyst and Base Components 50 parts of the catalyst component and 50 parts of the base component were discharged from a double cartridge and homogeneously mixed in a static mixer.

A cured opaque blue test specimen was obtained which had a final Shore A hardness of 40 and excellent mechanical properties (tear strength, elongation at tear).

EXAMPLE 3

Translucent Silicone Material Having Antimicrobial Properties (According to the Invention)

Catalyst Component 1.7% by weight vinyl end-blocked polydimethylosiloxane having a viscosity of 200 mPa·s;
1.7% by weight vinyl end-blocked polydimethylosiloxane having a viscosity of 1000 mPa·s;
2.6% by weight vinyl end-blocked polydimethylosiloxane having a viscosity of 10,000 mPa·s;
49.4% by weight vinyl end-blocked polydimethylosiloxane having a viscosity of 65,000 mPa·s;
8.7% by weight of a polydimethylosiloxane oil having a viscosity of 50 mPa·s;
12.0% by weight of a paraffin oil;
21.5% by weight of a pyrogenic silicic acid (surface-treated) having a BET surface between 150 $m^2/g$ and 200 $m^2/g$;
0.4% by weight of a platinum catalyst, and
2.0% by weight bioactive glass filler composed of 45±5% by weight $SiO_2$, 25±5% by weight $Na_2O$, 25±5% by weight $CaO$, and 5±5% by weight $P_2O_5$ were set out and homogeneously mixed for 30 minutes.

The mixture was then degassed for 15 minutes under vacuum.

Base Component 1.9% by weight vinyl end-blocked polydimethylosiloxane having a viscosity of 200 mPa·s;
1.9% by weight vinyl end-blocked polydimethylosiloxane having a viscosity of 1000 mPa·s;
2.9% by weight vinyl end-blocked polydimethylosiloxane having a viscosity of 10,000 mPa·s;
49.6% by weight vinyl end-blocked polydimethylosiloxane having a viscosity of 65,000 mPa·s;
3.1% by weight of a polydimethylosiloxane oil having a viscosity of 50 mPa·s;
7.6% by weight of a paraffin oil;
21.2% by weight of a pyrogenic silicic acid (surface-treated) having a BET surface between 150 $m^2/g$ and 200 $m^2/g$; and
11.8% by weight of a polymethylhydrogensiloxane having an SiH content of 2.3 mmol/g;
were set out and homogeneously mixed for 30 minutes.

The mixture was then degassed for 15 minutes under vacuum.

Mixture of Catalyst and Base Components 50 parts of the catalyst component and 50 parts of the base component were discharged from a double cartridge and homogeneously mixed in a static mixer.

A cured test specimen was obtained which had a final Shore A hardness of 40 and excellent mechanical properties (tear strength, elongation at tear).

The surface of the test specimen was very smooth and had a very homogeneous effect.

EXAMPLE 4

Opaque Silicone Material Having Antimicrobial Properties (According to the Invention)

Catalyst Component 1.8% by weight vinyl end-blocked polydimethylosiloxane having a viscosity of 200 mPa·s;
1.8% by weight vinyl end-blocked polydimethylosiloxane having a viscosity of 1000 mPa·s;
2.8% by weight vinyl end-blocked polydimethylosiloxane having a viscosity of 10,000 mPa·s;
50.0% by weight vinyl end-blocked polydimethylosiloxane having a viscosity of 65,000 mPa·s;
8.9% by weight of a polydimethylosiloxane oil having a viscosity of 50 mPa·s;
12.0% by weight of a paraffin oil;
21.7% by weight of a pyrogenic silicic acid (surface-treated) having a BET surface between 150 $m^2/g$ and 200 $m^2/g$;
0.3% by weight white pigment (titanium dioxide);
0.4% by weight of a platinum catalyst; and
0.3% by weight silver nanoparticles (particle size<100 nm) were set out and homogeneously mixed for 30 minutes.

The mixture was then degassed for 15 minutes under vacuum.

Base Component 1.9% by weight vinyl end-blocked polydimethylosiloxane having a viscosity of 200 mPa·s;
1.9% by weight vinyl end-blocked polydimethylosiloxane having a viscosity of 1000 mPa·s;
2.9% by weight vinyl end-blocked polydimethylosiloxane having a viscosity of 10,000 mPa·s;
48.1% by weight vinyl end-blocked polydimethylosiloxane having a viscosity of 65,000 mPa·s;
3.1% by weight of a polydimethylosiloxane oil having a viscosity of 50 mPa·s;
7.6% by weight of a paraffin oil;
21.2% by weight of a pyrogenic silicic acid (surface-treated) having a BET surface between 150 $m^2/g$ and 200 $m^2/g$;
1.5% by weight of a blue dye; and
11.8% by weight of a polymethylhydrogensiloxane having an SiH content of 2.3 mmol/g were set out and homogeneously mixed for 30 minutes.

The mixture was then degassed for 15 minutes under vacuum.

Mixture of Catalyst and Base Components 50 parts of the catalyst component and 50 parts of the base component were discharged from a double cartridge and homogeneously mixed in a static mixer.

A cured opaque blue test specimen was obtained which had a final Shore A hardness of 40 and excellent mechanical properties (tear strength, elongation at tear).

EXAMPLE 5

Opaque Silicone Material Having Antimicrobial Properties (According to the Invention)

Catalyst Component 1.6% by weight vinyl end-blocked polydimethylosiloxane having a viscosity of 200 mPa·s;
1.6% by weight vinyl end-blocked polydimethylosiloxane having a viscosity of 1000 mPa·s;
2.6% by weight vinyl end-blocked polydimethylosiloxane having a viscosity of 10,000 mPa·s;
49.3% by weight vinyl end-blocked polydimethylosiloxane having a viscosity of 65,000 mPa·s;
8.7% by weight of a polydimethylosiloxane oil having a viscosity of 50 mPa·s;
12.0% by weight of a paraffin oil;
21.5% by weight of a pyrogenic silicic acid (surface-treated) having a BET surface between 150 $m^2/g$ and 200 $m^2/g$;
0.4% by weight of a platinum catalyst; and 2.0% by weight bioactive glass filler composed of 45±5% by weight $SiO_2$, 25±5% by weight $Na_2O$, 25±5% by weight CaO, and 5±5% by weight $P_2O_5$; and 0.3% by weight silver nanoparticles (particle size<100 nm) were set out and homogeneously mixed for 30 minutes.

The mixture was then degassed for 15 minutes under vacuum.

Base Component 1.9% by weight vinyl end-blocked polydimethylosiloxane having a viscosity of 200 mPa·s;

1.9% by weight vinyl end-blocked polydimethylosiloxane having a viscosity of 1000 mPa·s;

2.9% by weight vinyl end-blocked polydimethylosiloxane having a viscosity of 10,000 mPa·s;

48.1% by weight vinyl end-blocked polydimethylosiloxane having a viscosity of 65,000 mPa·s;

3.1% by weight of a polydimethylosiloxane oil having a viscosity of 50 mPa·s;

7.6% by weight of a paraffin oil;

21.2% by weight of a pyrogenic silicic acid (surface-treated) having a BET surface between 150 $m^2/g$ and 200 $m^2/g$;

1.5% by weight of a blue dye; and 11.8% by weight of a polymethylhydrogensiloxane having an SiH content of 2.3 mmol/g were set out and homogeneously mixed for 30 minutes.

The mixture was then degassed for 15 minutes under vacuum.

Mixture of Catalyst and Base Components 50 parts of the catalyst component and 50 parts of the base component were discharged from a double cartridge and homogeneously mixed in a static mixer.

A cured opaque blue test specimen was obtained which had a final Shore A hardness of 40 and excellent mechanical properties (tear strength, elongation at tear).

The surface of the test specimen was very smooth and had a very homogeneous effect.

EXAMPLE 6

Addition-Crosslinking Silicone Paint Having Antimicrobial Properties (According to the Invention)

Catalyst Component 9.0% by weight vinyl end-blocked polydimethylosiloxane having a viscosity of 10,000 mPa·s;

9.0% by weight vinyl end-blocked polydimethylosiloxane having a viscosity of 65,000 mPa·s;

7.5% by weight of a pyrogenic silicic acid (surface-treated) having a BET surface between 150 $m^2/g$ and 200 $m^2/g$;

72.3% by weight of an organic solvent;

0.2% by weight inhibitor; and 2.0% by weight bioactive glass filler composed of 45±5% by weight $SiO_2$, 25±5% by weight $Na_2O$, 25±5% by weight CaO, and 5±5% by weight $P_2O_5$ Base Component 100.0% by weight of a polymethylhydrogensiloxane having an SiH content of 3 mmol/g;

Mixture of Catalyst and Base Components

The two paint components were mixed in a 1:33 volume ratio (base to catalyst), The surface of an ear piece painted with this paint had a high gloss.

We claim:

1. A two-component addition-cross linking silicone for producing antimicrobial earpieces comprising
   a) 0.1-70% by weight polyorganosiloxanes containing at least two end-blocked vinyl groups in the molecule;
   b) 0.1-15% by weight polyorganohydrogensiloxanes containing at least two SiH groups in the molecule;
   c) 0.01-2.0% by weight noble metal catalyst; and
   d) 2% by weight by of a non-toxic antimicrobial additive wherein the non-toxic antimicrobial additive is a combination of a bioactive glass filler having a composition of 45±5% by weight $SiO_2$, 25±5% by weight $Na_2O$, 25±5% by weight CaO, and 5±5% by weight $P_2O_5$, and having a particle size<100 nm, in an amount of 2% by weight of the addition cross linking silicone and further includes
   e) 0.3% by weight silver nanoparticles.

2. The two-component addition-cross linking silicone according to claim 1 further comprising at least one of the following:
   f) up to 10% by weight polyorganosiloxanes containing no reactive groups;
   g) up to 30% by weight reinforcing fillers having a charged or uncharged surface;
   h) up to 20% by weight non-reinforcing fillers;
   i) up to 30% by weight oils or other softeners;
   j) up to 10% by weight other additives and customary addition agents, adjuvants, and dyes; and
   k) 0-1% by weight inhibitors.

3. An addition cross linking silicone paint for surface finishing of ear pieces made of silicone, comprising:
   a) a polyorganosiloxane containing at least two end-blocked vinyl groups in the molecule;
   b) a polyorganohydrogensiloxane containing at least two SiH groups in the molecule;
   c) a noble metal catalyst;
   d) a non-toxic antimicrobial additive wherein the non-toxic antimicrobial additive is either a bioactive glass filler having a composition of 45±5% by weight $SiO_2$, 25±5% by weight $Na_2O$, 25±5% by weight CaO, and 5±5% by weight $P_2O_5$, and having a particle size<100 nm; and further includes
   e) 0.3% by weight silver nanoparticles; and
   f) an organic solvent in an amount sufficient to form a silicone paint for surface finishing of ear pieces made of silicone.

* * * * *